UNITED STATES PATENT OFFICE.

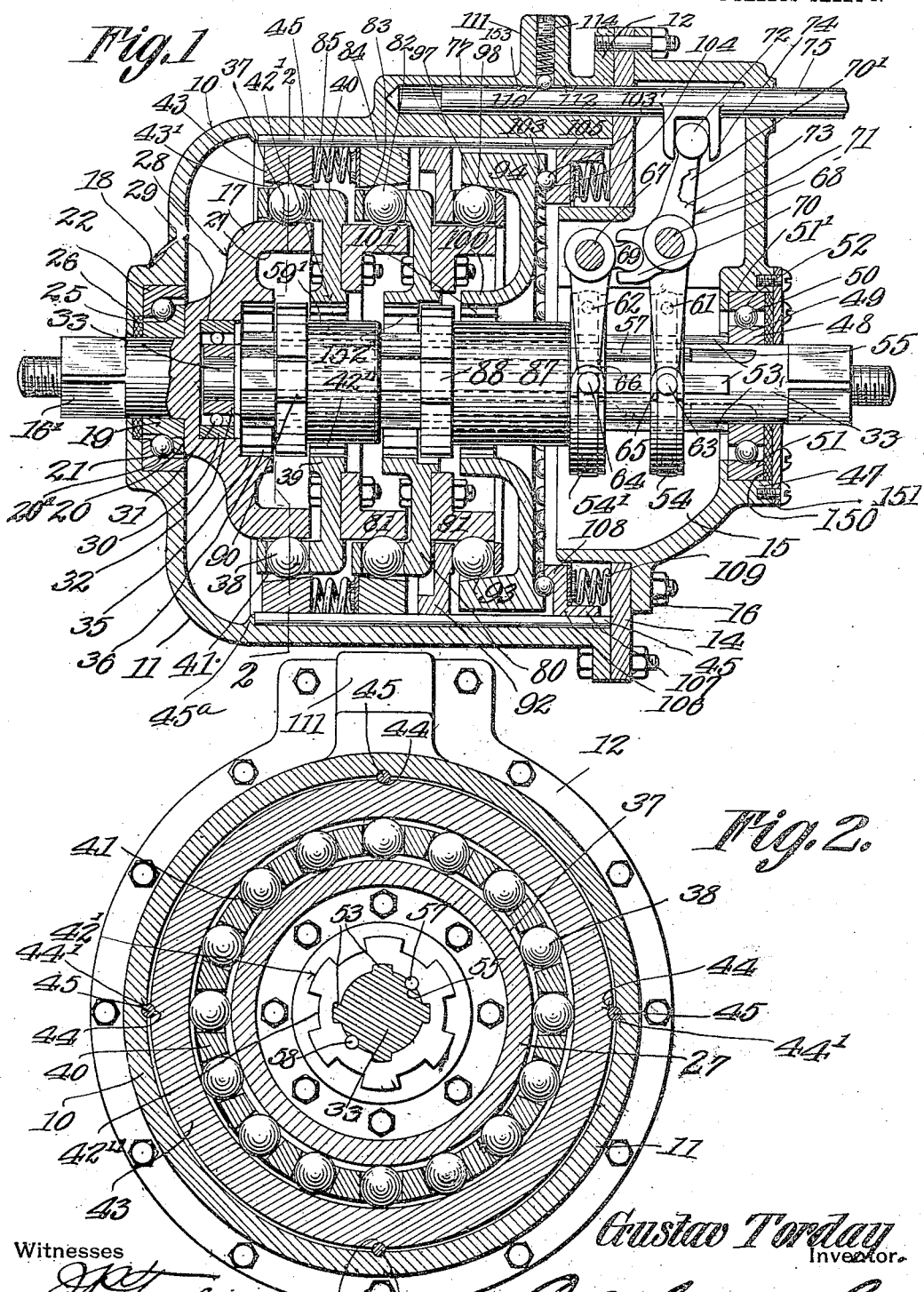

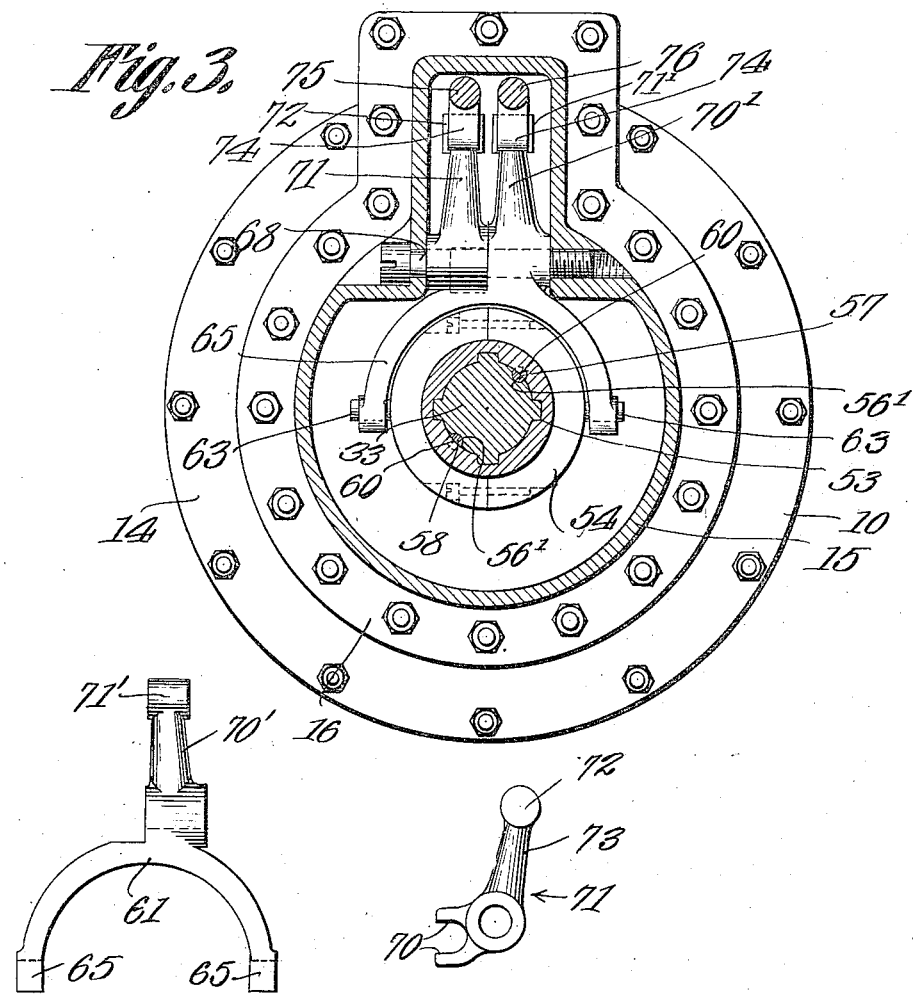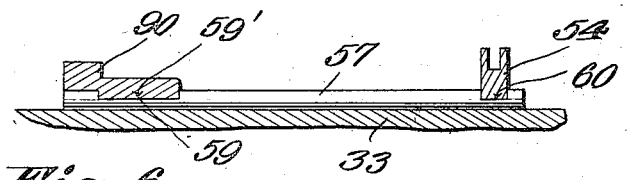

GUSTAV TORDAY, OF SOUTH BETHLEHEM, PENNSYLVANIA.

GEARING.

1,058,275.   Specification of Letters Patent.   Patented Apr. 8, 1913.

Application filed September 23, 1912. Serial No. 721,934.

*To all whom it may concern:*

Be it known that I, GUSTAV TORDAY, a citizen of the United States, residing at South Bethlehem, in the county of Northampton and State of Pennsylvania, have invented a new and useful Gearing, of which the following is a specification.

The device herein disclosed is an improvement in transmission gearing for motor vehicles.

One object of the present invention is to provide a device of the type above mentioned, having three forward speed and a reverse.

Another object of the invention is to provide a device of the type above described, in which the different speeds, and the reverse, are accomplished by means of a lost motion, created by novel combination of elements.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings:—Figure 1 shows the invention in longitudinal section; Fig. 2 is a transverse section on the line 2—2 of Fig. 1; Fig. 3 is a transverse section on the line 3—3 of Fig. 1; Fig. 4 is an elevation of one of the yokes; Fig. 5 is an elevation of the bell crank; and Fig. 6 is a longitudinal section of a portion of the driven shaft, the view depicting the means whereby the collars are held upon the shaft.

The structure herein disclosed will be found of peculiar efficiency in transmitting motion under a constant load.

In carrying out the invention there is provided a casing, denoted generally by the numeral 10, the casing 10 comprising a main member 11 having a flange 12, an auxiliary member 15 having a flange 16, and a ring 14 which is bolted between the flanges 12 and
16. The main member 11 of the casing 10 is provided with a hub 18 in which is mounted a bearing 22 having a ball race 21. In the rear face of the end wall of the hub 18 there is formed a recess 26, receiving a thrust ring 25.

The engine shaft, which is the driven element, is denoted by the numeral 16' and is formed integrally with a head 17. The head 17 comprises a hub 28 and a rearwardly extended flange 27. Surrounding the engine shaft 16' and abutting against the hub 28 is a bearing 19, the end thrust of which is received by the ring 25. The bearing 19 is provided with a ball race 20, coöperating with the ball race 21, and receiving balls 20ª.

A driven shaft 33 extends longitudinally of the casing 10 and terminates at its forward end within the hub 28 of the drive shaft 16'. The forward end of the driven shaft 33 carries a bearing 32, coöperating with balls 31 mounted to rotate within a bearing 30 which is secured within a recess 29 formed in the hub 28 of the head 17.

The auxiliary member 15 of the casing 10 is equipped with a hub 47 having a recess 51' in which is mounted a bearing 51 having a race 52, receiving balls 50, coöperating with a race 49, formed in a bearing 48 which is located in the recess 51'. The bearings 51 and 48 abut against a thrust member 150, held in the recess 51' by means of a closure 151 which is secured to the hub 47 of the auxiliary member 15 of the casing. The rear end of the driven shaft 33 is thus supported for rotation in the casing 1.

Located to the rear of the head 17 is an annular member 39, having a flange 40 which surrounds the flange 27 of the head 17. In the flange 40 are a plurality of radial openings 41, receiving balls 38 which register in a race 37 fashioned in the outer face of the flange 27 of the head 17.

Secured to the rear face of the annular member 39, is an annular flanged element 81, supporting balls 82, registering in openings 83 which are formed in the periphery of an annular member 80, resembling the annular member 39.

Secured to the rear face of the annular member 80 is an annular, flanged element 91, supporting balls 93 received within the openings in an annular element 92. The balls 93 are received by the beveled face 98 of a flange 97, constituting part of a ring 94 having a hub 100, through which the driven shaft 33 passes.

In the rear face of the ring 94 is formed a ball race 103, receiving balls 103', coöperating with a race 104, formed in a thrust member 105, the member 105 comprising a body 106 and flanges 107 and 108. Springs 109 abut against the body portion 106 of the thrust 105, the springs 109 being overhung by the flange 107. The springs 109 at their rear ends abut against the ring 14.

The balls 38 which are supported by the head 17 engage with the wedge face 43' of a ring 43. The balls 82 engage with the wedge face of a wedge ring 84, and compression springs 85 are interposed between the wedge rings 43 and 84. The wedge faces of the rings 43 and 84 slope in opposite directions.

In the peripheries of the wedge ring 43, of the wedge ring 84, of the annular element 92, and of the thrust member 105, but not in the periphery of the ring 94, are formed transverse grooves 44, registering with grooves 44' fashioned in the inner face of the casing. Mounted in the grooves 44 and 44' are rods 45, held against longitudinal movement by the ring 14 and by suitable projections 45ª upon the main member 11 of the housing. It will be understood that rods 45 serve to prevent the elements 43, 84, 92 and 105 from rotating independently of the casing 10.

In the hub 28 of the head 17 there is fashioned a recess 35, having radial extensions 36. These elements 35 and 36 constitute one member of a clutch. In the annular member 39 there is formed a recess 42' having radial extensions 42'', the elements 42' and 42'' constituting a clutch member similar to the clutch member 35—36 which is formed in the head 17. In the annular member 80 there is formed a clutch element 152 which is similar to the clutch 42'—42'' and 35—36, hereinbefore described. There is a clutch 101 in the ring 94.

The invention further includes a clutch 90 formed integrally with a sleeve 59', adapted to slide longitudinally of the driven shaft 33, the clutch 90 being adapted to register in the clutch member 35—36, or in the clutch member 42'—42''. By referring to Fig. 5 it will be seen that the sleeve 59' is received within transverse slots 59, formed at the forward ends of rods 57 and 58, mounted to slide in grooves 55 formed longitudinally in the driven shaft 33. The driven shaft 33 is equipped with longitudinal, radially extended ribs 53 which register in corresponding grooves in the clutch sleeve 59'. The rods 57 and 58 are provided adjacent their rear ends with transverse slots 60, receiving a collar 54 provided with trunnions 63, journaled in the arms 65 of a yoke 61 mounted to swing on a pin 68 which is upheld by the auxiliary part 15 of the casing 10. One arm 70' of the yoke 61 is equipped with an enlargement 71', having functions which will be set forth hereinafter.

A collar 54' is mounted upon the driven shaft 33, the collar 54' being formed integrally with the sleeve 87 of a clutch 88, the clutch 88 being adapted to register with the clutch 152 of the annular element 80, and with the clutch 101 in the hub 100 of the ring 94. The ribs 53 upon the driven shaft 33 coöperate with the clutch 88—87, and with the collars 54 and 54', in a manner hereinbefore described, in connection with the clutch 90—59'.

The collar 54', is equipped with trunnions 64 received within the arms 66 of a yoke 62, mounted to swing on a pin 67 which is supported by the auxiliary member 15 of the casing 10. The yoke 62 is equipped with a boss 69, received within the bifurcations 70 of a bell crank 71, the bell crank being journaled on the pin 68. One arm 73 of the bell crank 71 is equipped with an enlargement 72 coöperating with the enlargement 71' of the yoke 61.

A rod 75 is mounted to slide longitudinally in a bearing 77 formed integrally with the upper portion of the main member 11 of the casing 10. The rod 75 is equipped with spaced fingers 74, between which the enlargement 72 of the bell crank 71 is received. Another rod 76 is mounted to slide similarly to the rod 75, the rod 76 being equipped with fingers 74 which engage the enlargement 71' of the yoke 61. The rods 75 and 76 are equipped with spaced locking notches 153, adapted to receive balls 110 held in an extension 111 of the bearing 77, there being springs 112 in the extensions, which serve to hold the balls 110 in the notches 153, the tension of the springs 112 being regulated by means of screws 114. When sliding movement is imparted to the rod 76, the fingers 74 thereof will engage the enlargement 71' of the yoke 61 and tilt the yoke on the pin 68, the arms 65 of the yoke engaging trunnions 63 and imparting sliding movement to the collar 54. Since the collar 54 is connected as shown in Fig. 6 with the rods 57 and 58, the rods 57 and 58 will advance the clutch 90 until the same registers with the clutch element 35—36 which is formed in the head 17. If, under the circumstances above pointed out, rotatory movement is imparted to the driven shaft 16', motion will be transmitted directly from the shaft 16' to the driven shaft 33. The driven shaft 33, therefore, will be rotated forwardly, at its highest speed. Suppose, however, that the rod 76 has been manipulated as above described, to cause the clutch 90 to register in the clutch member 42'—42' of the annular member 39. Then as rotatory movement is imparted to the drive shaft 16', such motion will be transmitted into the head 17 and from the head 17, by way of the balls 38, into the annular member 39, from the annular member 39 by means of the clutch mechanism 42'—42''—90 into the driven shaft 33. During this operation, the balls 38 will exercise the functions of planet pinions and roll upon the fixed ring 43 the springs 85 serving to maintain the wedge ring 43 engaged with the balls 38. Owing to the coöperative relation existing between the balls 38 and the ring 43, the driven shaft 33 will be rotated at a less speed than that occurring when the driven shaft is directly connected with the drive shaft 16'. Suppose that the rod 76 is manipulated until the clutch 90 stands in the position shown in Fig. 1, the clutch 90 under such circumstances, being disconnected from the head 17 and from the annular member 39. If, now, the rod 75 be manipulated, the fingers 74 thereof, engaging the enlargement 72 upon the arm 73 of the bell crank 71 will tilt the bell crank 71 on the pin 68, the fingers 70 of the bell crank engaging the boss 69 of the yoke 62, the yoke 62 tilting on the pin 67 and engaging the trunnions 64 of the collar 54', the collar 54' and the clutch mechanism 87—88 being advanced, until the clutch element 88 coöperates with the clutch element 152 which is formed in the annular member 80. Then the drive will take place from the shaft 16' into the head 17, thence into the balls 38 and into the annular member 39, and from the annular member 39 into the annular member 81, and from the annular member 81, by way of the balls 82, into the annular member 80, and thence into the clutch 88 and into the driven shaft 33. When the parts are connected as above described, the balls 38, and the balls 82 as well will act as planet pinions. The driven shaft 33, therefore, will be rotated at a less speed than that occurring when the balls 38 only act as planet pinions, as hereinbefore described. Let it be supposed, again, that the clutch 90 stands as shown in Fig. 1, the rod 76 being actuated to move the collar 54' until the clutch 88 engages the element 101 in the ring 94. Then drive will take place from the shaft 16' into the head 17, and thence by way of the balls 38 into the annular member 39, and from the annular member 39 into the flanged element 81, and then by way of the balls 82, into the annular member 80, and from the annular member 80 by way of the flanged, annular element 91 into the balls 93. The balls 93 are held for rotation in the annular element 92 which, in its turn, is prevented from rotation, by means of the rod 45. The balls 93, acting upon the inner periphery of the flange 97 of the ring 94, will impart a reverse rotation to the ring 94, to the clutch 88 and to the driven shaft 33, the reverse, therefore, taking place at the lowest of the three speeds.

Having thus described the invention what is claimed is:—

1. A power transmitting mechanism including a drive shaft; a driven shaft; annular members; means for clutching one annular member to the driven shaft; a planet pinion motion connection between one annular member and the drive shaft; and a planet pinion connection between the annular members.

2. A power transmitting mechanism including a drive shaft; a driven shaft; annular members rotatable elements held in one member and having rolling contact with the drive shaft; rotatable elements held in the other annular member and having rolling contact with the first specified member; resiliently actuated wedge rings engaging the rolling elements; means for holding the rings against rotation; and means for clutching the rotatable elements to the driven shaft.

3. A power transmitting mechanism including a driven shaft; a drive shaft; annular members rotatable elements held in one annular member and having rolling contact with the drive shaft; rotatable elements held in the other annular member and having rolling contact with the first specified annular member; track members with which the foregoing rotatable elements are engaged; a fixed ring; rotatable elements in the fixed ring and having rolling contact with said other annular member; a movable ring, the interior of which is engaged by the rotatable elements of the fixed ring; means for clutching the movable ring to the driven shaft; and means for clutching the annular members to the driven shaft.

4. A power transmitting mechanism including a driven shaft; a drive shaft; annular members; rotatable elements held in one annular member and having rolling contact with the drive shaft; rotatable elements held in the other annular member and having rolling contact with the first specified annular member; a fixed ring; rotatable elements in the fixed ring and having rolling contact with said other annular member; a movable ring, the interior of which is engaged by the rotatable elements of the fixed ring; spring actuated wedges engaging the rotatable elements of the annular members; and individually operable clutches on the driven shaft, one of which is adapted to engage with said other annular member and with the movable ring respectively, the other of which is adapted to engage with the drive shaft and with the first specified annular member respectively.

In testimony that I claim the foregoing as my own, I have hereto affixed my signature in the presence of two witnesses.

GUSTAV TORDAY.

Witnesses:
 CHAS. A. GOSZTONYI,
 FRAU E. IYIROY.

---

Copies of this patent may be obtained for five cents each, by addressing the "Commissioner of Patents, Washington, D. C."